United States Patent
Smith et al.

(10) Patent No.: US 6,749,757 B2
(45) Date of Patent: Jun. 15, 2004

(54) METHOD AND APPARATUS FOR REMOVING HYDROCARBONS FROM WATER

(75) Inventors: Jeffrey J. Smith, New Orleans, LA (US); Jerald W. Darlington, Marengo, IL (US); John Occhipinti, Katy, TX (US); Gerard A. Just, Gadsen, AL (US)

(73) Assignee: Amcol International Corporation, Arlington Heights, IL (US)

( * ) Notice: Subject to any disclaimer, the term of this patent is extended or adjusted under 35 U.S.C. 154(b) by 0 days.

(21) Appl. No.: 10/227,682

(22) Filed: Aug. 26, 2002

(65) Prior Publication Data

US 2004/0035799 A1 Feb. 26, 2004

(51) Int. Cl.[7] .............................. C02F 1/24; C02F 9/02
(52) U.S. Cl. ....................... 210/703; 210/788; 210/789; 210/221.2; 210/512.1; 210/197; 210/708; 210/799; 669/691; 669/266; 669/202
(58) Field of Search .............................. 210/512.1, 197, 210/708, 799, 703, 669, 691, 266, 202, 221.2, 788, 789

(56) References Cited

U.S. PATENT DOCUMENTS

| | | | |
|---|---|---|---|
| 3,617,539 A | * | 11/1971 | Grutsch |
| 4,094,783 A | * | 6/1978 | Jackson |
| 4,186,087 A | | 1/1980 | Kato |
| 4,572,786 A | * | 2/1986 | Endo |
| 4,830,755 A | * | 5/1989 | Hardin |
| 4,839,040 A | | 6/1989 | Alm |
| 5,011,597 A | * | 4/1991 | Canzoneri et al. |
| 5,207,920 A | * | 5/1993 | Jones ......................... 210/703 |
| 5,242,580 A | | 9/1993 | Sury |
| 5,484,534 A | * | 1/1996 | Edmondson |
| 5,584,995 A | | 12/1996 | Meekel et al. |
| 5,762,781 A | | 6/1998 | Bodnaras |
| 5,840,183 A | | 11/1998 | Bakker |
| 6,238,569 B1 | | 5/2001 | Favret, Jr. |
| 6,398,966 B1 | | 6/2002 | Smith et al. |

FOREIGN PATENT DOCUMENTS

| | | | |
|---|---|---|---|
| DE | 3312070 | * | 10/1984 |
| DE | 10201916 A1 | | 7/2002 |
| EP | 0695719 A1 | | 2/1996 |
| SU | 636191 | * | 12/1978 |
| SU | 684016 | * | 9/1979 |
| WO | WO-86/06059 | | 10/1986 |
| WO | WO-90/07969 | | 7/1990 |
| WO | WO-99/00169 | | 1/1999 |

OTHER PUBLICATIONS

Syed A. Ali et al., "New Filtration Process Cuts Contaminants from Offshore Produced Water," Oil & Gas Journal, Nov. 2, 1998 (6 pages).
International Search Report dated Aug. 13, 2003.

* cited by examiner

Primary Examiner—Thomas M. Lithgow
(74) Attorney, Agent, or Firm—Marshall, Gerstein & Borun LLP

(57) ABSTRACT

An improved production water treatment system and method are disclosed. The treatment apparatus includes a vertically oriented vessel with tangentially disposed injection nozzles including one or more injection nozzles for the introduction of production water and one or more injection nozzles for the introduction of recycled water from the vessel and a sparge gas. The tangential orientation of the injection nozzles creates a cyclonic flow within the vessel for improved sparge gas bubble/hydrocarbon contact. A hydrocarbon-rich layer migrates to the top surface of the liquid in the vessel where it is removed about a center axis of the vessel. The resulting hydrocarbon-lean production water has a sufficiently low hydrocarbon content that it is eligible for more intensive processing, such as with organophillic clay cartridges.

30 Claims, 4 Drawing Sheets

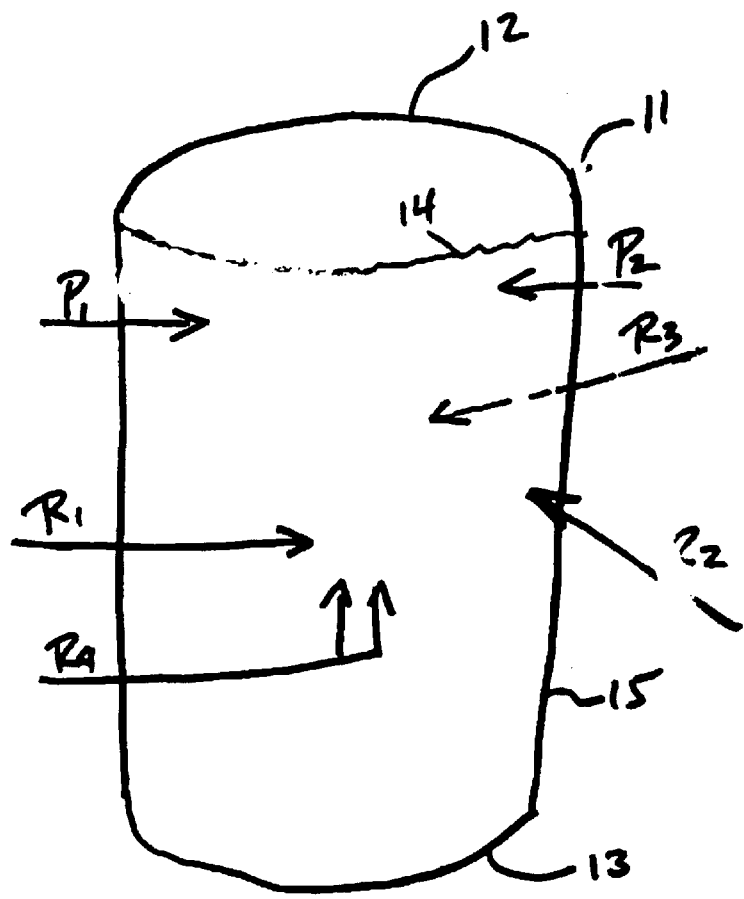
FIG. 2A
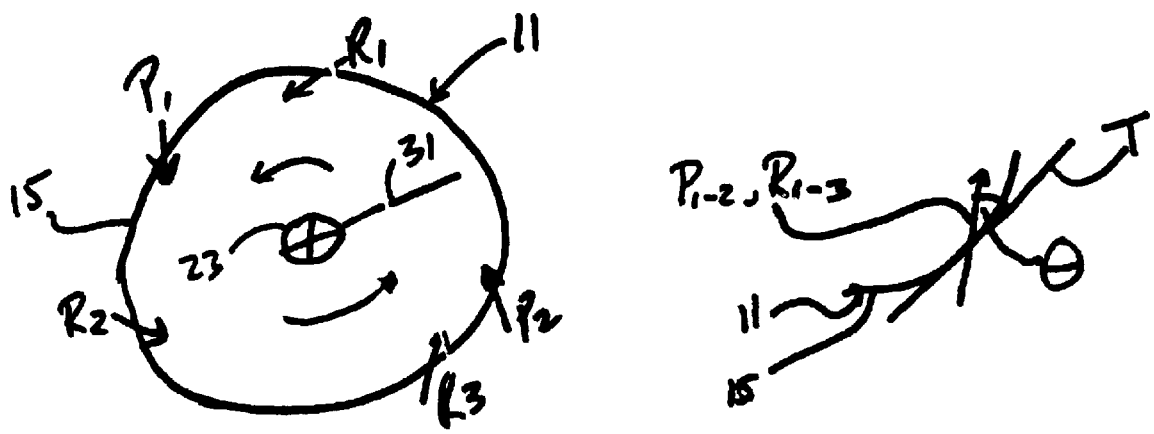
FIG. 2B
FIG. 2C

METHOD AND APPARATUS FOR REMOVING HYDROCARBONS FROM WATER

TECHNICAL FIELD

An apparatus and method for separating hydrocarbons and other organic materials from water, such as acidflow back water, completion fluid water, produced water and rain water collected from off-shore oil drilling and production platforms, are disclosed. More specifically, an apparatus is disclosed for pre-treating these production waters generated on off-shore oil drilling and production platforms by injecting the production water in an enclosed vessel and generating a cyclonic flow within the vessel. Recycled water from the vessel and a sparge gas are also tangentially injected into the vessel to further encourage the cyclonic flow. The gas and hydrocarbon-rich water migrate towards the top surface of the liquid in the vessel and towards the axial center of the vessel where the hydrocarbon-rich water is purged. Hydrocarbon-lean water is then purged from a bottom section of the vessel and discharged or processed further.

BACKGROUND OF THE RELATED ART

During crude oil production, a significant amount of water is co-produced with the oil. This "produced water" is contaminated with residual or hydrocarbons and therefore is a substantial waste stream. For example, it is estimated that 380 million tons of produced water was generated in the North Sea during the 2001 production year. While new operational fields produce relatively minor amounts of water, e.g., 10–20% percent of the total production (i.e., water and oil), as an oil field ages, the produced water volume increases to 80–90% of the total production. These huge volumes of produced water must be treated before they are returned to the sea because they contain significant amounts of hydrocarbon contaminants.

Currently, off-shore production facilities treat the hydrocarbon-contaminated production water by adding oil coalescing and water clarifying chemical agents to assist in a mechanical separation of the hydrocarbons from the water. However, this technology results in the discharge of production water to the ocean which still contains hydrocarbons in the range of 20–40 ppm and additional trace impurities such as benzene related compounds, phenols, alkyl phenols and polyaromatic hydrocarbons in concentrations ranging from 100 to 10,000 ppb. While a 20–40 ppm hydrocarbon content meets current regulations, it is been found that the discharge of production water with the above-noted trace impurities can adversely affect marine life.

Often, large amounts of natural gas are produced with crude oil. To separate the gas from the oil and the oil from the water, three phase separators have been developed. In a three phase separator, the gas is first separated from the oil and water and the oil layer is physically separated from the water and sent to a dehydrator to remove residual water. The water phase, which includes a small fraction of residual oil, enters a water skimmer to skim the free oil off of the top of the water layer. After skimming, the water layer, which still contains a substantial amount of hydrocarbons, enters a horizontal induced gas floatation separator. These horizontal induced gas floatation (HIGF) separators can produce a water phase with a hydrocarbon content of 20–40 ppm.

HIGF separators work by bubbling a gas through the production water which results in hydrocarbon droplets floating to the surface. Typically, the gas used is natural gas produced at the well. Nitrogen or other inert gases may be used as well. Each HIGF separator includes a number of cells, each with its own gas diffuser to maximize the natural gas bubble/hydrocarbon droplet contact. While the HIGF separators are commonly used, they suffer from numerous drawbacks.

At the outset, HIGF separators are extremely large. Their length can reach 60 feet which represents a tremendous amount of deck space, which is at a premium on an off-shore oil platform. Many older platforms, where space is limited, cannot be outfitted with such separators. It will be noted that all currently available "horizontal" induced gas floatation separators have a length or width substantially greater than their height.

Further, HIGF separators to date have not been able to reduce hydrocarbon concentration below an approximately 20 ppm threshold level. While this level meets current regulatory standards, it falls short of the proposed standards for the North Sea which may take effect as early as 2005.

HIGF separators are also susceptible to wave motion experienced by modern platforms. Specifically, modern deep water platforms are not permanently anchored to the sea floor but, instead, are tethered and move with currents. Thus, these floating platforms will sway and roll with wave motion. This rolling causes the water inside the HIGF separators to form waves, which makes skimming hydrocarbons from the water surface difficult and often ineffective. Further, intense wave motion will cause some units to shut down thereby creating disruptions in platform production because of a lack of storage capacity for untreated production water.

Also, because of their large size, in the event the production water output exceeds expectations, operators are unable to expand capacity by adding additional HIGF separators because of a lack of available floor space. As a result, either the operator must reduce production or discharge produced water with a hydrocarbon content greater than the regulatory limit.

Further, the flow rate of production water from a well can vary greatly and HIGF separators operate more efficiently in a steady state condition and the efficiencies of these systems is compromised with varying input flows. Still further, HIGF separators are limited in their ability to treat water with higher hydrocarbon concentrations, i.e. greater than 300 ppm. Concentrations exceeding 300 ppm generally exceed the separators ability to achieve acceptable hydrocarbon removal. HIGF separators are also designed to remove dispersed oil or hydrocarbon droplets. Their ability to remove partially soluble components such as alkyl phenols and polyaromatic hydrocarbons is extremely limited as these components are relatively soluble in water and do not respond to gas/bubble contact. As noted above, these compounds are extremely harmful to marine life.

One substitute for HIGF separators has been suggested in the form of a Vertical vortex separator. One example is disclosed in WO 99/00169. The disclosed apparatus relies upon creating a vortex in a cylindrical vessel for purposes of separating oil from water. However, this apparatus is suitable only for preliminary separation of oil from production water and does not reduce the hydrocarbon content in the production water to a level acceptable for discharge or more intensive treatment such as filtering with organophillic clays.

The treatment of production water with organophilic clays is also known and is disclosed by commonly owned U.S. Pat. Nos. 5,935,444, 6,398,966 and 6,398,951, all of which are incorporated herewith. The production water is typically introduced into a contained vessel which contains a plurality of cartridges containing the organophilic clay. The production water flows through the packed cartridge beds of organophilic clay and the hydrocarbon contaminants are adsorbed onto the clay particles. The process is very efficient, resulting in extremely low hydrocarbon content of the treated production water.

However, it has been found that when the hydrocarbon content of the production water inputted into an organophilic clay containing vessel exceeds 100 ppm, the available adsorbing sites on the clay are readily used up and the cartridges must be replaced frequently, thereby increasing costs and creating time delays. The vortex creating apparatus of WO 99/00169 is not suitable as a sole pre-treatment of production water upstream of an organophilic clay filtering apparatus.

Therefore, there is a two-fold need for improved methods of treating production water, especially on off-shore oil platforms. First, an improved method and apparatus is required which avoids the disadvantages of the HIGF separators described above. Further, there is a need for an improved hydrocarbon/water separation method and apparatus which can be used as an effective pretreatment prior to additional treatment of the water with organophilic clay cartridges.

SUMMARY OF THE DISCLOSURE

An improved apparatus for separating hydrocarbons from water is disclosed. The apparatus comprises a vessel having a height and a diameter. The height of the vessel is greater than the diameter of the vessel thereby providing it with a "vertical" configuration which is preferred by off-shore oil platform operators. The vessel further comprises an enclosed top and bottom with a vertical cylindrical section extending therebetween.

At least one input inlet is provided that extends through the vertical cylindrical section. The input inlet is connected to a supply of input liquid, i.e., untreated production water. The input inlet is directed "tangentially" or at an angle of less than or equal to 45° with respect to a tangent of the vertical cylindrical section so that the input inlet can encourage or generate a cyclonic flow within the vessel.

The apparatus further includes at least one recycle fluid/sparge gas inlet that extends through the vertical cylindrical section of the vessel as well. The recycle fluid/sparge gas inlet is connected to a recycled pump which, in turn, is connected to the vessel by a recycle line. The recycle fluid/sparge gas inlet is also connected to a source of sparge gas. Similar to the input inlet, the recycle fluid/sparge gas inlet is also directed "tangentially" or at an angle of less than or equal to 45° with respect to a tangent of the vertical cylindrical section for generating or encouraging cyclonic flow within the vessel.

The apparatus also includes a hydrocarbon-lean water outlet. The apparatus further includes an upwardly directed collection bucket disposed along an axial center of the vessel. The collection bucket is also connected to a hydrocarbon-rich outlet line. The vessel is also equipped with a sparge gas outlet line.

In a refinement, the apparatus further includes an upwardly directed recycle fluid/sparge gas inlet. This upwardly directed recycle fluid/sparge gas inlet is also connected to the recycle pump and the supply of sparge gas and is directed upwardly to generate or encourage upward flow within the vessel.

In another refinement, the at least one input inlet comprises two input inlets disposed diametrically opposite the vessel from one another. The two input inlets are also disposed at a common vertical height.

Further, three input inlets may be provided which are equidistantly spaced around the vessel, or at approximately 120° intervals around the vessel. Again, a common vertical height is preferred.

In another refinement, the at least one recycle fluid/sparge gas inlet further comprises two recycle fluid/sparge gas inlets disposed diametrically opposite the vessel from one another and having common vertical height. Preferably, three recycle fluid/sparge gas inlets are provided, equidistantly spaced around the vessel at a common vertical height. In still a further refinement, the common vertical height of the recycle fluid/sparge gas inlets is disposed below the common vertical height of the input inlets.

In still another refinement, the input inlets are disposed approximately one foot below the surface of the circulating cyclonic flow within the vessel. The recycle fluid/sparge gas inlets are disposed below the input inlets, and preferably at or about a mid-point of the vessel.

In another refinement, a ratio of the vessel to the diameter of the vessel ranges from about 5:1 to about 1.5:1, more preferably about 2.5.

Further, as noted above, to meet increasing demanding environmental concerns, the hydrocarbon-lean water outlet may be connected to a secondary treatment vessel containing organophilic media for adsorbing any residual hydrocarbons that remain in the pre-treated production water.

A method for reducing hydrocarbon content in a stream of production water is also disclosed. The method comprises tangentially injecting the production water into a cylindrical vessel to encourage cyclonic flow within the vessel, tangentially injecting the flow of recycled water from the vessel and sparge gas into the vessel at a level below a point where the production water is injected and to further encourage cyclonic flow within the vessel, allowing the sparge gas and hydrocarbon-rich water to migrate to a top surface of the circulating liquid within the vessel, purging the hydrocarbon-rich water at a top surface of the circulating liquid and along a central axis of the vessel, and purging hydrocarbon-lean water from a lower point in the vessel below where the flow of recycled water and sparge gas are injected into the vessel.

In a refinement, the method also includes maintaining a positive gage pressure within the vessel with additional sparge gas or an inner gas. In another refinement, the sparge gas is natural gas co-produced with the production water to be treated.

An improved system for treating production waters is also disclosed. The improved system includes a vertically-oriented pre-treatment vessel where the production water is mixed with a sparge gas, such as co-produced natural gas, and a hydrocarbon-rich layer is skimmed off the top surface while a hydrocarbon-lean layer is removed through a lower portion of the pre-treatment vessel. The hydrocarbon-lean water is then transmitted to a secondary treatment vessel where it is contacted with an organophillic clay.

BRIEF DESCRIPTION OF THE DRAWINGS

The invention is illustrated more or less diagrammatically in the accompanying drawings wherein:

FIG. 2A is a partial perspective view of the vessel illustrated in FIG. 1 showing the relative placement of the production water input nozzles and recycle fluid/sparge gas input nozzles;

FIG. 2B is a top sectional view of the vessel illustrated in FIG. 1, particularly illustrating the preferred placement of the production water input nozzles and recycle fluid/sparge gas input nozzles;

FIG. 2C illustrates the tangential angle of the input nozzles relative to the vessel wall;

It will be understood that the drawings are not necessarily to scale in that the embodiments are illustrated using graphic symbols, diagrammatic representations and fragmentary views. In certain instances, details which are not necessary for an understanding of the disclosed apparatuses and methods or which render other details difficult to perceive may have been omitted. It should be understood, of course, that this disclosure is not necessarily limited to the particular embodiments illustrated herein.

DETAILED DESCRIPTION OF THE PRESENT AND PREFERRED EMBODIMENTS

Figure 1:
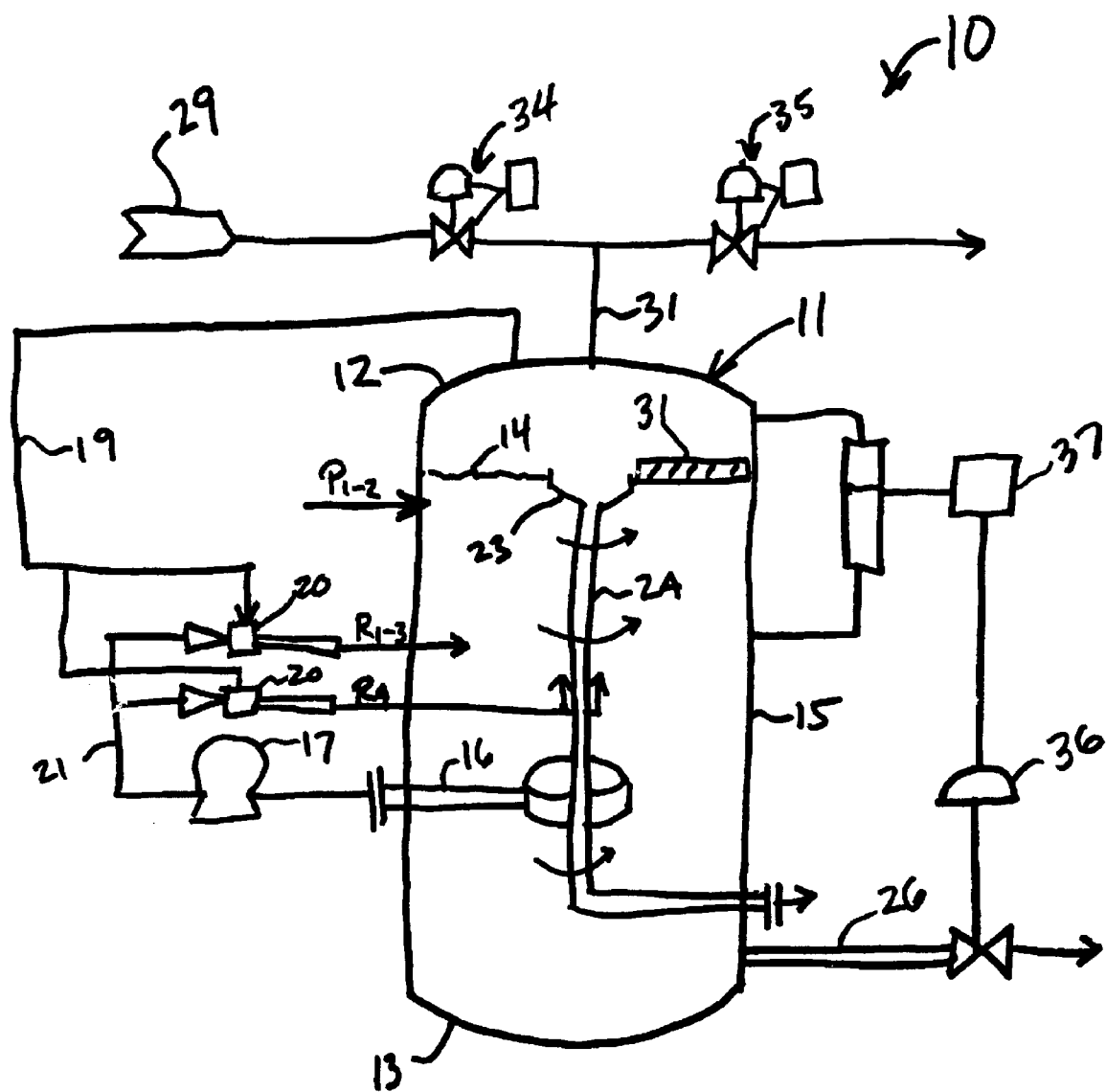
FIG. 1 is a schematic illustration of a production water treatment system made in accordance with this disclosure.

Turning to FIG. 1, an improved apparatus 10 is disclosed which has a vertical orientation and can provide a superior substitute for the currently employed HIGF separators. The apparatus 10 includes a vessel 11 which has a height to width ratio ranging from about 5.0 to about 1.5, preferably about 2.5. One suitable size for the vessel 11 is a height of 10 feet and a width or diameter of 4 feet.

Production water is introduced into the vessel through one or more input inlets indicated at $P_1$, $P_2$ in FIGS. 1 and 2A–2C. It will be noted that the number of production water input inlets can vary in anywhere from 1 to 3 or 4 and that the use of two production water input inlets $P_1$, $P_2$ as shown in FIGS. 1 and 2A–2C is an example, albeit a preferred example. Referring to FIGS. 2A–C, it will be noted that the production water input inlets $P_1$, $P_2$ are directed "tangentially" with respect to the vessel 11. That is, the nozzles $P_1$, $P_2$ are directed at a positive angle with respect to a tangent to the cylindrical section of the vessel 11 as shown in FIG. 2C. Specifically, any nozzle such as $P_1$, $P_2$, $R_1$, $R_2$ or $R_3$ will pass through the vessel 11 as shown at an angle $\theta$ with respect to a tangent T taken at the entry point of the nozzle. The angle $\theta$ can vary, but should preferably be less than or equal to 45° so that the injected fluid encourages a cyclonic flow within the vessel 11 for enhance mixing of sparge gas and production liquid as discussed below.

Returning to FIGS. 2B, the production water input inlets $P_1$, $P_2$, are preferably disposed diametrically opposite the vessel 11 from each other as shown in FIG. 2B. If three production water input inlets are utilized, then it would be preferred that these inlets be equidistantly spaced around the vessel 11 or 120° apart from one another. It will be also noted that the height of the production water input inlets $P_1$, $P_2$, are about the same and are disclosed towards the top 12 of the vessel 11 as opposed to the bottom 13. The production water input inlets $P_1$, $P_2$, is preferably disposed about a foot below the surface 14 of the liquid circulated in the vessel 11.

In addition to the production water input inlets $P_1$, $P_2$, one or more recycled fluid/sparge gas inlet nozzles are utilized, three of which are shown at $R_1$, $R_2$, $R_3$ in FIGS. 1 and 2. If three of these inlets are utilized, the nozzle should be equidistantly spaced around the vessel wall 15 as shown in FIG. 2B. Water is withdrawn from the vessel 11 through the recycle line 16 where it is drawn into a pump 17 and mixed with sparge gas via the line 19 which recycles sparge gas from the vessel 11 and introduces the sparge gas through the eductors 20 where the sparge gas is mixed with the liquid being delivered by the recycle pump 17. The recycle fluid/sparge gas mixture is then injected into the vessel 11 by way of the nozzles $R_1$, $R_2$, $R_3$ and $R_4$. Again, the number of recycle water/sparge gas nozzles R can vary and can range from as few as one to more than the three that are shown.

In addition to the tangentially disposed recycle fluid/sparge gas nozzles $R_1$, $R_2$, $R_3$ shown in FIGS. 2A–2B, an additional nozzle is shown at $R_4$ which is directed upwardly and disposed towards the bottom 13 of the vessel 11. This upwardly directed recycle fluid/sparge gas inlet $R_4$ promotes upward flow within the vessel 11 in addition to the cyclonic flow provided by the nozzles $P_{1-2}$, $R_{1-3}$.

The inventors have found that the combination of the cyclonic flow produced by the nozzles $P_{1-2}$, $R_{1-3}$ and the turbulent upward flow provided by the nozzle $R_4$ in addition to the injection of sparge gas using the eductors 20, which would normally be co-produced natural gas, provides for improved mixing of the sparge gas with the produced water, improved contact between the gas bubbles and the hydrocarbon contained in the produced water and therefore better separation that HIGF separators and previously available vortex separators.

Due to the improved mixing of the sparge gas bubbles and production water, hydrocarbon-rich production water migrates to the surface 14 of the liquid contained in the vessel and further migrates towards an axial center of the vessel 11. The hydrocarbon-rich water is then collected at the bucket shown at 23 which is connected to a hydrocarbon-rich outlet line 24.

Figure 4:
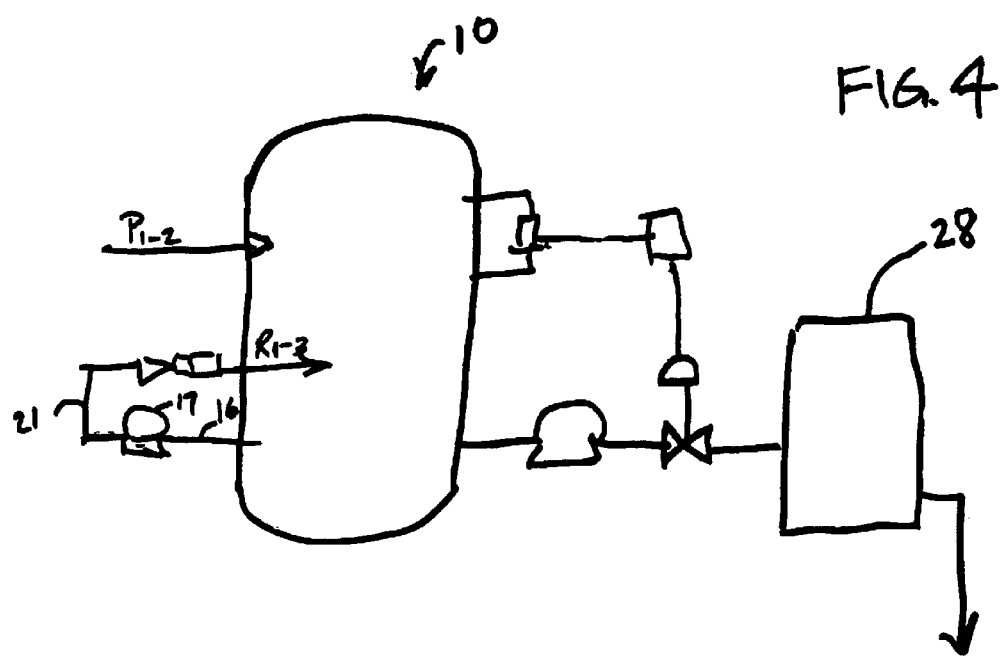
FIG. 4 is a schematic illustration of the apparatus of FIG. 1 connected to a secondary treatment vessel containing an organophilic clay filter system.

In contrast, hydrocarbon-lean water is removed through the lower outlet 26 where it may be discharged or, in the alternative, as shown in FIG. 4, treatment may be continued in one or more vessels shown at 28. It has been found that additional treatment with organophillic clay is preferred. Further, the apparatus 10 is a preferred pre-treatment prior to additional treatment with organophillic clay. Specifically, as shown graphically in FIG. 5, the apparatus 10 is capable of reducing the hydrocarbon content in production water that is greater than 200 ppm to a value of less than 50 ppm. As noted above, when production water is fed into an organophillic clay treatment system that has a hydrocarbon content of greater than 100 ppm, the organophillic clay cartridges tend to foul quickly and require frequent replacement which is time consuming and costly. Thus, the disclosed apparatus, which can easily reduce the hydrocarbon content to a less than 50 ppm, is a preferred pre-treatment for systems that incorporate organophillic clay technology.

Flow through the hydrocarbon-lean outlet 26 is controlled by the valve 36 which is controlled by a liquid level controller 37.

The vessel 10 should be operated at a positive gage pressure, preferably ranging from 5 to 10 psig. The pressure may be maintained with a gas source 29 which may be sparge gas or an inert gas. The gas applied 29 is connected to the vessel by way of the line 31 and control valve 34. Control valve 35 is used to bleed excess pressure. A convenient sparge gas is, of course, co-produced natural gas.

Figure 5:
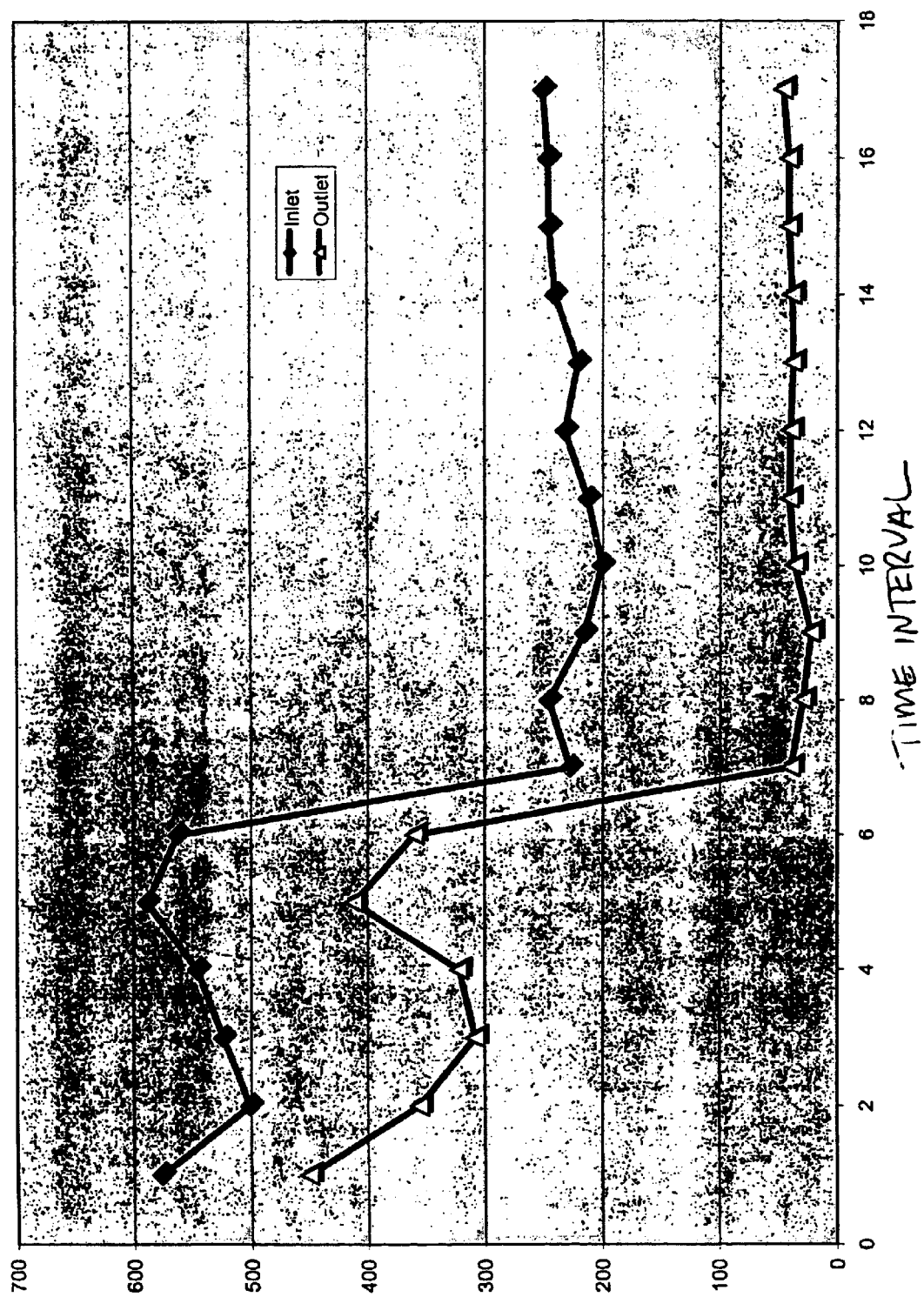
FIG. 5 illustrates, graphically, the hydrocarbon concentration reduction achieved by an apparatus made in accordance with this disclosure.

An apparatus with the general nozzle configuration illustrated in FIGS. 2A–2C was tested and the experimental results are presented in FIG. 5. The vessel pressure was maintained between 6 and 10 psig and at a temperature of about 145° F. The produced water flow rate through the apparatus ranged from 2 to 3 barrels per minute (BPM). A standard production water treatment chemical, 6022Y, was also added.

Figure 3:
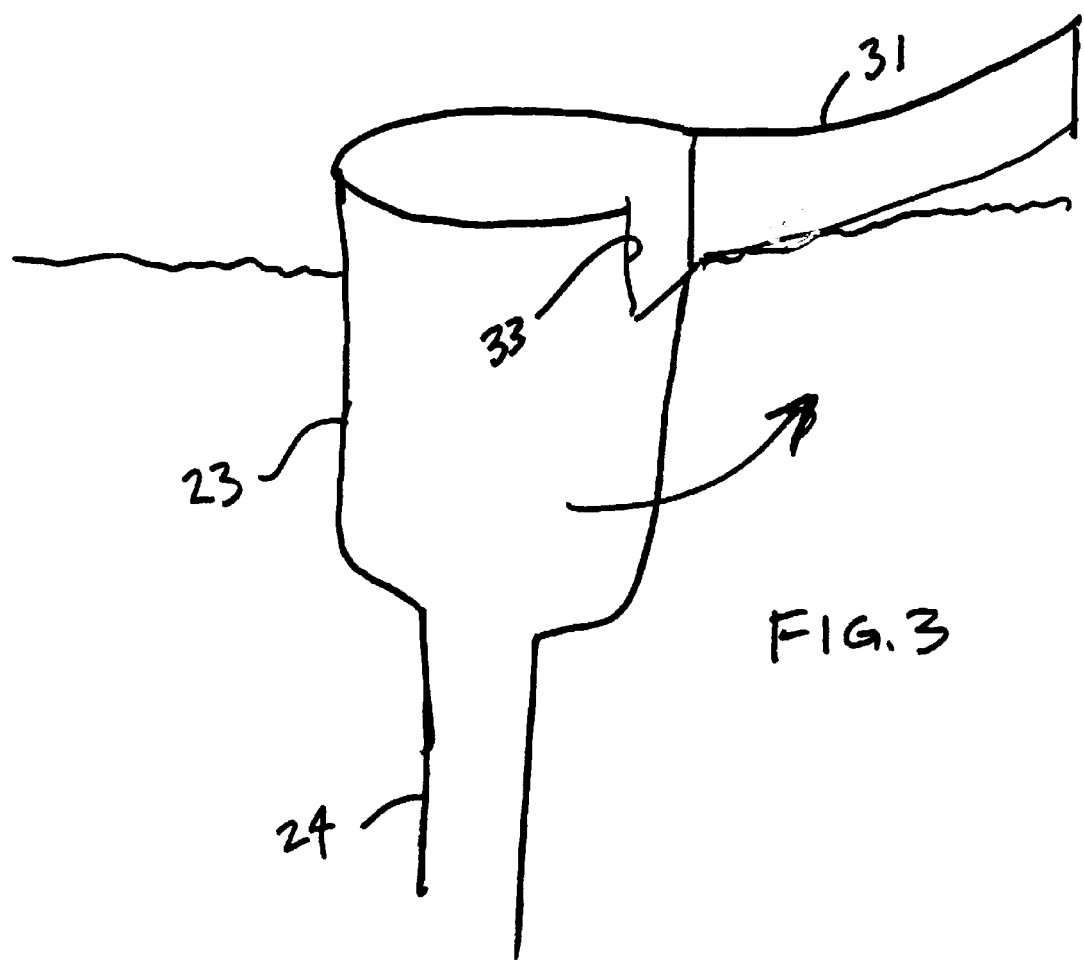
FIG. 3 is a perspective view of the bucket, baffle and partial view of the hydrocarbon-rich outlet line.

Further, referring to FIGS. 1 and 3, it has been found that the performance of the apparatus 10 is improved with the use of a baffle 31 which aides in skimming the hydrocarbon-rich water off the top surface 14 and directing it towards the slot 33 of the bucket 23. Standard wire-type baffles 31 may be employed. Preferably, the baffle 31 is parabolically shaped to compliment the contour of the surface 14 of the cyclonically flowing fluid in the vessel 11.

It will finally be noted that use of the apparatus 10 in conjunction with organophillic clay technology as represented in U.S. Pat. Nos. 5,935,444, 6,398,966 and 6,398,951 is expected to have a substantial benefit to the environment. Specifically, it has been found that benzene related compounds, phenols, alkyl phenols and polyaromatic hydrocarbons, even in trace amounts ranging from 100 to 10,000 ppb, present a substantial threat to marine life, including many species of male fish. Utilizing the apparatus 10 as disclosed herein in combination with organophillic clay technology can all but eliminate the discharge of these trace impurities back to the ocean.

While only certain embodiments have been set forth, alternative embodiments and various modifications will be apparent from the above description to those skilled in the art. These and other alternatives are considered equivalents within the spirit and scope of this disclosure.

What is claimed:

1. An apparatus for separating hydrocarbons from water, the apparatus comprising:
   a vessel having a height and a diameter, the height being greater than the diameter, the vessel further comprising an enclosed top and bottom with a vertical cylindrical section extending therebetween,
   at least one input inlet extending through the vertical cylindrical section of the vessel, the input inlet connected to a supply of hydrocarbon-rich input liquid to be treated, the input inlet being directed at an angle of less than or equal to 45° with respect to a tangent of the vertical cylindrical section for generating a cyclonic flow within the vessel,
   at least one recycle fluid/sparge gas inlet extending through the vertical cylindrical section of the vessel, the recycle fluid/sparge gas inlet connected to a recycle pump and source of sparge gas, the recycle pump connected to the vessel by a recycle line, the recycle fluid/sparge gas inlet being directed at an angle of less than or equal to 45° with respect to a tangent of the vertical cylindrical section for generating a cyclonic flow within the vessel,
   a hydrocarbon-lean water outlet,
   an upwardly directed collection bucket disposed along an axial center of the vessel, the collection bucket connected to a hydrocarbon-rich outlet line,
   a sparge gas input/outlet line,
   an upwardly directed recycle fluid/sparge gas inlet, the upwardly directed recycle fluid/sparge gas inlet connected to a recycle pump and the supply of sparge gas, the upwardly directed recycle fluid/sparge gas inlet generating an upward flow within the vessel.

2. The apparatus of claim 1 wherein the at least one input inlet comprises two input inlets disposed diametrically opposite the vessel from one another.

3. The apparatus of claim 1 wherein the at least one input inlet comprises three input inlets equidistantly spaced around the vessel.

4. The apparatus of claim 1 wherein the at least one input inlet is disposed vertically above the at least one recycle fluid/sparge gas inlet.

5. The apparatus of claim 1 wherein the at least one input inlet is disposed vertically above the at least one recycle fluid/sparge gas inlet and the upwardly directed recycle fluid/sparge gas inlet.

6. The apparatus of claim 1 wherein a ratio of the height of the vessel to the diameter of the vessel ranges from about 5:1 to about 1.5:1.

7. The apparatus of claim 6 wherein the ratio is about 2.5.

8. The apparatus of claim 1 wherein the hydrocarbon-lean water outlet line is connected to a secondary treatment vessel containing an organophilic media providing intimate contact with the hydrocarbon-lean water and adsorption of hydrocarbon contaminant in the hydrocarbon-lean water on the media.

9. The apparatus of claim 8 further comprising an output pump disposed in the lean water outlet line and between the vessel and secondary treatment vessel.

10. The apparatus of claim 1 further comprising an eductor disposed between the at least one recycle fluid/sparge gas inlet and the source of sparge gas for introducing sparge gas into the recycled fluid downstream of the recycle pump.

11. The apparatus of claim 10 wherein the source of sparge gas comprises sparge gas recycled from the vessel as well as a separate supply of sparge gas connected to the sparge gas input/outlet line for pressurizing the vessel.

12. An apparatus for separating hydrocarbons from water, the apparatus comprising:
   a vessel having a height and a diameter, the height being greater than the diameter, the vessel further comprising an enclosed top and bottom with a vertical cylindrical section extending therebetween,
   at least one input inlet extending through the vertical cylindrical section of the vessel, the input inlet connected to a supply of hydrocarbon-rich input liquid to be treated, the input inlet being directed at an angle of less than or equal to 45° with respect to a tangent of the vertical cylindrical section for generating a cyclonic flow within the vessel,
   at least one recycle fluid/sparge gas inlet extending through the vertical cylindrical section of the vessel, the recycle fluid/sparge gas inlet connected to a recycle pump and source of sparge gas, the recycle pump connected to the vessel by a recycle line, the recycle fluid/sparge gas inlet being directed at an angle of less than or equal to 45° with respect to a tangent of the vertical cylindrical section for generating a cyclonic flow within the vessel,
   a hydrocarbon-lean water outlet,
   an upwardly directed collection bucket disposed along an axial center of the vessel, the collection bucket connected to a hydrocarbon-rich outlet line,
   a sparge gas input/outlet line,
   wherein the at least one recycle fluid/sparge gas inlet comprises two recycle fluid/sparge gas inlets disposed diametrically opposite the vessel from one another.

13. An apparatus for separating hydrocarbons from water, the apparatus comprising:

a vessel having a height and a diameter, the height being greater than the diameter, the vessel further comprising an enclosed top and bottom with a vertical cylindrical section extending therebetween, at least one input inlet extending through the vertical cylindrical section of the vessel, the input inlet connected to a supply of hydrocarbon-rich input liquid to be treated, the input inlet being directed at an angle of less than or equal to 45° with respect to a tangent of the vertical cylindrical section for generating a cyclonic flow within the vessel, at least one recycle fluid/sparge gas inlet extending through the vertical cylindrical section of the vessel, the recycle fluid/sparge gas inlet connected to a recycle pump and source of sparge gas, the recycle pump connected to the vessel by a recycle line, the recycle fluid/sparge gas inlet being directed at an angle of less than or equal to 45° with respect to a tangent of the vertical cylindrical section for generating a cyclonic flow within the vessel, a hydrocarbon-lean water outlet, an upwardly directed collection bucket disposed along an axial center of the vessel, the collection bucket connected to a hydrocarbon-rich outlet line, a sparge gas input/outlet line, wherein the at least one recycle fluid/sparge gas inlet comprises three recycle fluid/sparge gas inlets equidistantly spaced around the vessel.

14. An apparatus for separating hydrocarbons from water, the apparatus comprising:

a vessel having a height and a diameter, the height being greater than the diameter, the vessel further comprising an enclosed top and bottom with a vertical cylindrical section extending therebetween, at least one input inlet extending through the vertical cylindrical section of the vessel, the input inlet connected to a supply of hydrocarbon-rich input liquid to be treated, the input inlet being directed at an angle of less than or equal to 45° with respect to a tangent of the vertical cylindrical section for generating a cyclonic flow within the vessel, at least one recycle fluid/sparge gas inlet extending through the vertical cylindrical section of the vessel, the recycle fluid/sparge gas inlet connected to a recycle pump and source of sparge gas, the recycle pump connected to the vessel by a recycle line, the recycle fluid/sparge gas inlet being directed at an angle of less than or equal to 45° with respect to a tangent of the vertical cylindrical section for generating a cyclonic flow within the vessel, a hydrocarbon-lean water outlet, an upwardly directed collection bucket disposed along an axial center of the vessel, the collection bucket connected to a hydrocarbon-rich outlet line, a sparge gas input/outlet line, wherein the collection bucket is connected to a radially outwardly extending baffle for skimming hydrocarbons off of a surface of the liquid in the vessel, and wherein the baffle is parabolically shaped.

15. An apparatus for separating hydrocarbons from water, the apparatus comprising:

a vessel having a height and a diameter, the height being greater than the diameter, the vessel further comprising an enclosed top and bottom with a vertical cylindrical section extending therebetween, a plurality of input inlets extending through the vertical cylindrical section of the vessel, the input inlets connected to a supply of hydrocarbon-rich input liquid to be treated, the inputs inlet being directed at an angle of less than or equal to 45° with respect to a tangent of the vertical cylindrical section for generating a cyclonic flow within the vessel, the input inlets being equidistantly spaced around a perimeter of the vessel, a plurality of recycle fluid/sparge gas inlets extending through the vertical cylindrical section of the vessel, the recycle fluid/sparge gas inlets connected to a recycle pump and a source of sparge gas, the recycle pump connected to the vessel by a recycle line, the recycle fluid/sparge gas inlet being directed at an angle of less than or equal to 45° with respect to a tangent of the vertical cylindrical section for generating a cyclonic flow within the vessel, the recycle fluid/sparge gas inlets being equidistantly spaced around the perimeter of the vessel and below the input inlets, an upwardly directed recycle fluid/sparge gas inlet, the upwardly directed recycle fluid/sparge gas inlet connected to the recycle pump and the supply of sparge gas, the upwardly directed recycle fluid/sparge gas inlet generating an upward flow within the vessel, the upwardly directed recycle fluid/sparge gas inlet being disposed below the recycle fluid/sparge gas inlets, a hydrocarbon-lean water outlet, an upwardly directed collection bucket disposed along the axial center of the vessel, the collection bucket connected to a hydrocarbon-rich outlet line, a sparge gas outlet line.

16. The apparatus of claim 15 wherein the plurality of input inlets comprises two input inlets disposed diametrically opposite the vessel from one another.

17. The apparatus of claim 15 wherein the plurality of recycle fluid/sparge gas inlets comprises three recycle fluid/sparge gas inlets equidistantly spaced around the vessel.

18. The apparatus of claim 15 wherein a ratio of the height to the diameter of the vessel ranges from about 5:1 to about 1.5:1.

19. The apparatus of claim 18 wherein the ratio is about 2.5.

20. The apparatus of claim 15 wherein the collection bucket is connected to a radially outwardly extending baffle for skimming hydrocarbons off of a surface of the liquid in the vessel.

21. The apparatus of claim 20 wherein the baffle is parabolically shaped.

22. The apparatus of claim 15 wherein the hydrocarbon-lean water outlet line is connected to a secondary treatment vessel containing an organophilic media providing intimate contact with the hydrocarbon-lean water and adsorption of hydrocarbon contaminant in the hydrocarbon-lean water on the media.

23. The apparatus of claim 22 further comprising an output pump disposed in the lean water outlet line and between the vessel and secondary treatment vessel.

24. The apparatus of claim 15 further comprising an eductor disposed between the at least one recycle fluid/sparge gas inlet and the source of sparge gas for introducing sparge gas into the recycled fluid downstream of the recycle pump.

25. The apparatus of claim 24 wherein the source of sparge gas comprise sparge gas recycled from the vessel as well as a separate supply of sparge gas connected to the sparge gas input/outlet line for pressurizing the vessel.

26. A method for reducing hydrocarbon content in a stream of production water, the method comprising:
 tangentially injecting the production water into a cylindrical vessel to encourage cyclonic flow within the vessel,
 tangentially and upwardly injecting a flow of recycled water from the vessel and sparge gas into the vessel at a level below a point where the production water is injected and to further encourage cyclonic flow within the vessel and to encourage upward flow within the vessel,
 allowing the sparge gas and hydrocarbon-rich water to migrate to a top surface of liquid in the vessel,
 purging the hydrocarbon-rich water at the tap surface and along a central axis of the vessel and drawing the hydrocarbon-rich water downward and out of the vessel through a conduit that extends substantially along the central axis,
 purging the hydrocarbon-lean water from a lower point in the vessel below the where the flow of recycled water and sparge gas are injected into the vessel.

27. The method of claim 26 further comprising
 maintaining a positive gauge pressure within the vessel with additional sparge gas or an inert gas.

28. The method of claim 26 further comprising purging sparge gas from a top portion of the vessel in the event the pressure exceeds a desired positive gauge pressure.

29. The method of claim 26 further comprising
 introducing the hydrocarbon-lean water into a secondary treatment vessel containing an organophilic media, and
 allowing intimate contact with the hydrocarbon-lean water and adsorption of hydrocarbon contaminant in the hydrocarbon-lean water on the media.

30. A system for separating hydrocarbons from water, the system comprising:
 a first pre-treatment vessel, the first pre-treatment vessel comprising
  a height and a diameter, the height being greater than the diameter, the pre-treatment vessel further comprising an enclosed top and bottom with a vertical cylindrical section extending therebetween,
 at least one input inlet tangentially extending through the vertical cylindrical section of the pre-treatment vessel for generating cyclonic flow in the vessel, the input inlet connected to a supply of hydrocarbon-rich input liquid to be treated,
 at least one recycle fluid/sparge gas inlet extending upwardly through the vertical cylindrical section of the pre-treatment vessel for generating an upward flow in the vessel, the recycle fluid/sparge gas inlet connected to a recycle pump and a source of sparge gas, the recycle pump connected to the pre-treatment vessel by a recycle line,
 a hydrocarbon-lean water outlet,
 an upwardly directed collection bucket disposed along an axial center of the pre-treatment vessel, the collection bucket connected to a hydrocarbon-rich outlet line,
 a sparge gas inlet/outlet line,
 the hydrocarbon-lean water outlet connected to a secondary treatment vessel containing an organophilic media.

\* \* \* \* \*

UNITED STATES PATENT AND TRADEMARK OFFICE
CERTIFICATE OF CORRECTION

PATENT NO. : 6,749,757 B2
DATED : June 15, 2004
INVENTOR(S) : Jeffrey J. Smith et al.

It is certified that error appears in the above-identified patent and that said Letters Patent is hereby corrected as shown below:

Title page,
Item [75], Inventors, delete "Jerald W. Darlington," and replace with -- Jerald W. Darlington, Jr., --.

Column 10,
Line 25, delete "comprise" and replace with -- comprises --.

Column 11,
Line 15, delete "tap" and replace with -- top --.
Line 21, delete "below the where the" and replace with -- below where the --.

Signed and Sealed this

Ninth Day of August, 2005

JON W. DUDAS
*Director of the United States Patent and Trademark Office*